(12) United States Patent
Hirooka et al.

(10) Patent No.: US 11,306,640 B2
(45) Date of Patent: Apr. 19, 2022

(54) ABNORMALITY DETECTION APPARATUS FOR ELECTRICALLY HEATED CATALYST

(71) Applicant: TOYOTA JIDOSHA KABUSHIKI KAISHA, Aichi-ken (JP)

(72) Inventors: Shigemasa Hirooka, Susono (JP); Tsuyoshi Obuchi, Susono (JP); Shingo Korenaga, Shizuoka (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 143 days.

(21) Appl. No.: 16/744,180

(22) Filed: Jan. 16, 2020

(65) Prior Publication Data

US 2020/0232370 A1    Jul. 23, 2020

(30) Foreign Application Priority Data

Jan. 17, 2019    (JP) ............................. JP2019-006356

(51) Int. Cl.
   *F01N 9/00*    (2006.01)
   *F01N 3/20*    (2006.01)
   (Continued)

(52) U.S. Cl.
   CPC ............... *F01N 9/00* (2013.01); *B60L 1/02* (2013.01); *B60L 50/66* (2019.02); *B60L 58/12* (2019.02);
   (Continued)

(58) Field of Classification Search
   CPC ........ F01N 9/00; F01N 3/2026; F01N 3/2013; F01N 2550/00; F01N 2550/22;
   (Continued)

(56) References Cited

U.S. PATENT DOCUMENTS 5,555,725 A *   9/1996   Shimasaki ............ F01N 3/2013
                                                        60/277
5,758,492 A    6/1998   Kato et al.
                (Continued)

FOREIGN PATENT DOCUMENTS

JP    2000-220443 A    8/2000
JP    2011231708 A    11/2011
JP    201440789 A    3/2014

OTHER PUBLICATIONS

Office Action in U.S. Appl. No. 16/744,883, dated Aug. 23, 2021, 21pp.
(Continued)

*Primary Examiner* — Brandon D Lee
(74) *Attorney, Agent, or Firm* — Hauptman Ham, LLP (57) ABSTRACT

The electrically heated catalyst to which the present disclosure is applied is provided in a hybrid vehicle capable of switching its running mode between EV mode and HC mode and supplied with electrical energy before the internal combustion engine is started. An abnormality detection apparatus calculates an electrical energy parameter relating to the integrated value of electrical power actually supplied to the electrically heated catalyst (actually supplied electrical power) over a specific period of time from the time when supply of electrical power to the electrically heated catalyst is started and detects an abnormality of the electrically heated catalyst by comparing the electrical energy parameter with a threshold. The threshold is set according to the rate of decrease of the charge level of a battery (charge level decrease rate) during a period in which electrical power is supplied to the electrically heated catalyst.

4 Claims, 8 Drawing Sheets

(51) Int. Cl.
*B60L 1/02* (2006.01)
*B60L 58/12* (2019.01)
*B60L 50/60* (2019.01)

(52) U.S. Cl.
CPC ......... *F01N 3/2013* (2013.01); *F01N 3/2026* (2013.01); *F01N 2550/00* (2013.01); *F01N 2550/22* (2013.01); *F01N 2900/0602* (2013.01); *F01N 2900/08* (2013.01); *F01N 2900/104* (2013.01)

(58) Field of Classification Search
CPC ....... F01N 2900/104; F01N 2900/0602; F01N 2900/08; F01N 3/2006; F01N 3/101; F01N 11/00; B60L 1/02; B60L 58/12; B60L 50/66; B60L 58/14; B60L 58/13; B60L 2240/642; B60L 2240/12; B60L 2240/547; B60L 2240/549; B60L 2270/12; B60L 50/60; B60L 50/16; Y02T 90/16; Y02T 10/7072; Y02T 10/72; Y02T 10/12; Y02T 10/70; Y02A 50/20
See application file for complete search history.

(56) References Cited

U.S. PATENT DOCUMENTS

| | | |
|---|---|---|
| 6,185,931 B1 | 2/2001 | Shimasaki et al. |
| 2009/0211233 A1* | 8/2009 | Watanabe ............. F01N 3/2013 60/277 |
| 2011/0118924 A1 | 5/2011 | Nasu et al. |
| 2011/0268613 A1 | 11/2011 | Hirai et al. |
| 2012/0004801 A1* | 1/2012 | Watanabe ............. F01N 3/2026 701/22 |
| 2012/0047090 A1 | 2/2012 | Gunther |
| 2012/0247090 A1* | 10/2012 | Yoshioka ............. F01N 3/2013 60/286 |
| 2013/0298535 A1 | 11/2013 | Aoki |
| 2020/0232371 A1 | 7/2020 | Obuchi et al. |
| 2020/0232372 A1 | 7/2020 | Obuchi et al. |
| 2020/0232373 A1 | 7/2020 | Korenaga |

OTHER PUBLICATIONS

Office Action in U.S. Appl. No. 16/744,184, dated Aug. 24, 2021, 25pp.
Office Action in U.S. Appl. No. 16/744,177, dated Jul. 7, 2021, 9pp.
Notice of Allowance in U.S. Appl. No. 16/744,883, dated Dec. 23, 2021, 14pp.
Notice of Allowance in U.S. Appl. No. 16/744,184, dated Dec. 20, 2021, 17pp.
Notice of Allowance in U.S. Appl. No. 16/744,177, dated Jan. 3, 2022, 11pp.

* cited by examiner

ABNORMALITY DETECTION APPARATUS FOR ELECTRICALLY HEATED CATALYST

CROSS-REFERENCE TO RELATED APPLICATIONS

This application claims the benefit of Japanese Patent Application No. 2019-006356, filed on Jan. 17, 2019, which is hereby incorporated by reference herein in its entirety.

BACKGROUND

Technical Field

The present disclosure relates to an abnormality detection apparatus for an electrically heated catalyst.

Description of the Related Art

There are known exhaust gas purification apparatuses for internal combustion engines that include an exhaust gas purification catalyst adapted to be heated by a heating element that is energized electrically. Such a catalyst will also be referred to as "electrically heated catalyst" hereinafter. The electrically heated catalyst of such an exhaust gas purification apparatus for an internal combustion engine is energized (or supplied with electrical power) before the startup of the internal combustion engine to reduce exhaust emissions during and/or just after the startup of the internal combustion engine.

If the electrically heated catalyst has an abnormality or problem, there may be cases where it is not heated to an intended temperature even if a normal amount of electrical energy is supplied to it. It is known to detect an abnormality of an electrically heated catalyst by comparing the integrated value of electrical power actually supplied to the electrically heated catalyst and the integrated value of a standard electrical power (see, for example, Patent Literature 1 in the citation list below).

Patent Literature

Patent Literature 1: Japanese Patent Application Laid-Open No. 2000-220443

SUMMARY

In cases where an electrically heated catalyst is provided in a hybrid vehicle capable of switching its running mode between EV (Electric Vehicle) mode in which the vehicle is driven only by an electric motor energized by electrical power charged in a battery and HV (Hybrid Vehicle) mode in which the vehicle is driven by an internal combustion engine and the electric motor in cooperation, the vehicle may be caused to run in EV mode while electrical power is being supplied to the electrically heated catalyst in some cases. Then, if the rate of battery consumption becomes high due to running in EV mode, supply of electrical power to the electrically heated catalyst may be stopped halfway, and the internal combustion engine maybe started to charge the battery. In such cases, the amount of exhaust emissions emitted in the period during and just after the startup of the internal combustion engine tend to be larger than in the case where the internal combustion engine is started after the completion of the supply of electrical energy to the electrically heated catalyst. If the supply of electrical power to the electrically heated catalyst is stopped halfway, the amount of exhaust emissions emitted in the period during and just after the startup of the internal combustion engine can vary depending on the duration of the supply of electrical power to the electrically heated catalyst till the stopping, even if the degree of abnormality of the electrically heated catalyst is the same.

The present disclosure has been made in view of the above circumstances, and an object of the present disclosure is to provide a technology that enables accurate detection of abnormalities of electrically heated catalysts that can lead to an increase in exhaust emissions.

To solve the above problem, an abnormality detection apparatus for an electrically heated catalyst according to the present disclosure is configured to detect an abnormality of the electrically heated catalyst by comparing an electrical energy parameter relating to electrical energy actually supplied to the electrically heated catalyst over a specific period from the start of supply of electrical power to the electrically heated catalyst with a specific threshold. The abnormality detection apparatus varies the specific threshold according to the rate of decrease of the charge level of the battery during a period in which electrical power is supplied to the electrically heated catalyst. With this feature, the abnormality detection apparatus can detect an abnormality that can lead to an increase in exhaust emissions with high accuracy.

More specifically, the abnormality detection apparatus according to the present disclosure is applied to an electrically heated catalyst that is provided in an exhaust passage of an internal combustion engine provided in a hybrid vehicle capable of switching its running mode between a mode in which the vehicle is driven by an electric motor energized only by electrical power charged in a battery (EV mode) and a mode in which the vehicle is driven by an internal combustion engine and the electric motor in cooperation (HV mode) and includes an exhaust gas purification catalyst and a heating element that generates heat when supplied with electrical power, the electrical resistance of the heating element being larger when its temperature is low than when it is high. The abnormality detection apparatus includes a controller comprising at least one processor. The controller is configured to: apply a voltage to the electrically heated catalyst from the battery before startup of the internal combustion engine and to adjust the applied voltage defined as the voltage applied to the electrically heated catalyst in such a way as to make the electrical power as the product of the applied voltage and a catalyst current defined as the electrical current flowing through the electrically heated catalyst per unit time equal to a target electrical power to be supplied to the electrically heated catalyst; calculate an electrical energy parameter relating to an actually supplied electrical energy defined as the integrated value of electrical power actually supplied to the electrically heated catalyst over a specific period from the time when the application of the applied voltage to the electrically heated catalyst by the controller is started; acquire a charge level decrease rate defined as the rate of decrease of the charge level of the battery in a period during which the applied voltage is being applied to the electrically heated catalyst by the controller; set a specific threshold according to the charge level decrease rate acquired by the controller, the specific threshold serving as a criterion in detecting an abnormality of the electrically heated catalyst; and detect an abnormality of the electrically heated catalyst by comparing the electrical energy parameter calculated by the controller and the specific threshold set by the controller.

When the temperature of the electrically heated catalyst (or exhaust gas purification catalyst) provided in the hybrid vehicle is low, the controller applies the applied voltage to the electrically heated catalyst before the startup of the internal combustion engine to cause the heating element to generate heat, thereby preheating the exhaust gas purification catalyst. In this process, the controller controls the voltage applied to the electrically heated catalyst (which will be referred to as "applied voltage") in such a way as to make the electrical power as the product of the applied voltage and the current flowing through the electrically heated catalyst per unit time (which will be referred to as "catalyst current") equal to a target electrical power to be supplied to the electrically heated catalyst (namely, a target value of the electrical power to be supplied to the electrically heated catalyst). In consequence, the cleaning performance of the electrically heated catalyst in the period during and just after the startup of the internal combustion engine is enhanced, and therefore exhaust emissions can be reduced. The target electrical power is set taking account of factors such as the structure and performance of a device(s) used to supply electrical power to the electrically heated catalyst (e.g. a battery, a generator, and/or a DC-to-DC converter).

If an abnormality such as oxidation of the heating element or electrodes or a crack thereof occurs, the electrical resistance of the electrically heated catalyst may become larger than that in the normal condition. The voltage that can be applied to the electrically heated catalyst has a specific upper limit that is determined by the structure and performance of the device(s) used to supply electrical power to the electrically heated catalyst. Therefore, when the electrically heated catalyst has an abnormality, there is a possibility that the catalyst current may be insufficient even if a voltage as high as the specific upper limit is applied to the electrically heated catalyst and that the electrical power that can be supplied to the electrically heated catalyst may be lower than the target electrical power. If this is the case, the duration of the supply of electrical power required to raise the temperature of the electrically heated catalyst to a desired temperature will become long. This required duration will also be referred to as the "required power supply time" hereinafter.

If the required power supply time becomes long due to an abnormality of the electrically heated catalyst, the supply of electrical power to the electrically heated catalyst may be stopped in some cases. For example, if the hybrid vehicle is caused to run in EV mode while electrical power is being supplied to the electrically heated catalyst, the charge level decrease rate of the battery becomes high. Then, there is a possibility that the charge level decrease rate of the battery may decrease to a lower bound before the lapse of the required power supply time. The lower bound mentioned above is such a value that if the charge level of the battery becomes lower than the lower bound, it is determined that it is necessary to start the internal combustion engine to charge the battery. Therefore, if the charge level of the battery decreases to the aforementioned lower bound while electrical power is being supplied to the electrically heated catalyst, the supply of electrical power to the electrically heated catalyst is stopped, and the internal combustion engine is started. In such cases, the charge level of the battery tends to decrease to the lower bound earlier when the charge level decrease rate during the supply of electrical power to the electrically heated catalyst is high than when it is low, and accordingly, the time when the supply of electrical power to the electrically heated catalyst is stopped (or the time when the internal combustion engine is started) tends to be earlier. In other words, the length of time over which electrical power is actually supplied to the electrically heated catalyst tends to be shorter when the charge level decrease rate during the supply of electrical power to the electrically heated catalyst is high than when it is low. In consequence, the temperature of the electrically heated catalyst at the time when the supply of electrical power to the electrically heated catalyst is stopped tends to be lower and, accordingly, the cleaning performance of the electrically heated catalyst tends to be lower when the charge level decrease rate during the supply of electrical power to the electrically heated catalyst is high than when it is low. Therefore, the amount of exhaust emissions emitted in the period during and just after the startup of the internal combustion engine tends to be larger when the charge level decrease rate during the supply of electrical power to the electrically heated catalyst is high than when it is low, even if the degree of abnormality of the electrically heated catalyst is the same.

The abnormality detection apparatus for an electrically heated catalyst according to the present disclosure performs detection of an abnormality of the electrically heated catalyst by comparing an electrical energy parameter relating to the integrated value of electrical power actually supplied to the electrically heated catalyst (actually supplied electrical energy) over a specific period from the start of the supply of electrical power to the electrically heated catalyst with a specific threshold. The specific threshold is set according to the rate of decrease of the charge level of the battery in a period during which electrical power is being supplied to the electrically heated catalyst. The abnormality detection apparatus configured as above is able to detect an abnormality that can lead to an increase in exhaust emissions in the period during and just after the startup of the internal combustion engine with high accuracy, even when the supply of electrical power to the electrically heated catalyst is stopped halfway. The specific period mentioned above is set as a period during which there is a significant difference between the value of the electrical energy parameter in the case where the electrically heated catalyst is normal and the value of the electrical energy parameter in the case where the electrically heated catalyst is abnormal. For example, the specific period as such may be set as a period longer than the time needed for the actual electrical power to substantially reach the target electrical power after the start of the supply of electrical power to the electrically heated catalyst and shorter than the time needed for the target electrical energy to reach a standard amount of electrical energy after the start of the supply of electrical power to the electrically heated catalyst when the electrically heated catalyst is normal. The standard amount of electrical energy mentioned above is, for example, an amount of electrical energy that is needed to raise the temperature of the electrically heated catalyst from its initial temperature at the time when the supply of electrical power is started to a specific temperature (e.g. a temperature at which the exhaust gas purification catalyst becomes active).

The controller may calculate the ratio of the actually supplied electrical energy to a target electrical energy defined as the integrated value of the target electrical power over the specific period. This ratio will also be referred to as the "supplied electrical energy ratio" hereinafter. In this case, the controller may set a specific ratio as the specific threshold in such a way that the specific ratio is made larger when the charge ratio decrease rate acquired by the controller is high than when it is low. Then, the controller may determine that the electrically heated catalyst is abnormal, if the supplied electrical energy ratio calculated by the controller is smaller than the specific ratio set by the controller.

As described above, the electrical resistance of the electrically heated catalyst is larger when the electrically heated catalyst is abnormal than when it is normal. Accordingly, the aforementioned supplied electrical energy ratio is smaller when the electrically heated catalyst is abnormal than when it is normal. Even if the degree of abnormality of the electrically heated catalyst is the same, in other words, even if the supplied electrical energy ratio is the same, the amount of exhaust emissions in the period during and just after the startup of the internal combustion engine tends to be larger when the charge level decrease rate during the supply of electrical power to the electrically heated catalyst is high than when it is low. Therefore, it is necessary to detect minor abnormalities (that lead to larger supplied electrical energy ratio) when the charge level decrease rate during the supply of electrical power to the electrically heated catalyst is high than when it is low. To this end, the abnormality detection apparatus according to the present disclosure may set the specific ratio larger when the charge level decrease rate during the supply of electrical power to the electrically heated catalyst is high than when it is low. This enables the abnormality detection apparatus to detect an abnormality leading to an increase in exhaust emissions in the period during and just after the startup of the internal combustion engine with high accuracy.

The electrical energy parameter according to the present disclosure is not limited to the above-described supplied electrical energy ratio. For example, the actually supplied electrical energy in the specific period or the difference between the actually supplied electrical energy and the target electrical energy during the specific period may be used as the electrical energy parameter. In the case where the actually supplied electrical energy in the specific period is used as the electrical energy parameter, the specific threshold may be set larger when the charge level decrease rate during the supply of electrical power to the electrically heated catalyst is high than when it is low. In the case where the difference between the actually supplied electrical energy and the target electrical energy during the specific period is used as the electrical energy parameter, the specific threshold may be set smaller when the charge level decrease rate during the supply of electrical power to the electrically heated catalyst is high than when it is low.

In the case where the abnormality detection apparatus according to the present disclosure is configured to detect an abnormality of the electrically heated catalyst by comparing the supplied electrical energy ratio with the specific ratio, the controller may be further configured to predict a running load of the hybrid vehicle at the time of startup of the internal combustion engine. In this case, the controller may set the specific ratio larger when the charge ratio decrease rate acquired by the controller is high than when it is low, and when the running load predicted by the controller is high than when it is low. This is because the load of the internal combustion engine (or engine load) just after the startup of the internal combustion engine tends to be higher, and therefore the amount of exhaust emissions tends to be larger when the running load of the internal combustion engine at the time of startup of the internal combustion engine is high than when it is low even if the degree of abnormality of the electrically heated catalyst is the same.

The present disclosure enables an abnormality detection apparatus to accurately detect an abnormality of an electrically heated catalyst that can lead to an increase in the exhaust emissions.

DESCRIPTION OF EMBODIMENTS

In the following, a specific embodiment of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

Embodiment

Figure 1:
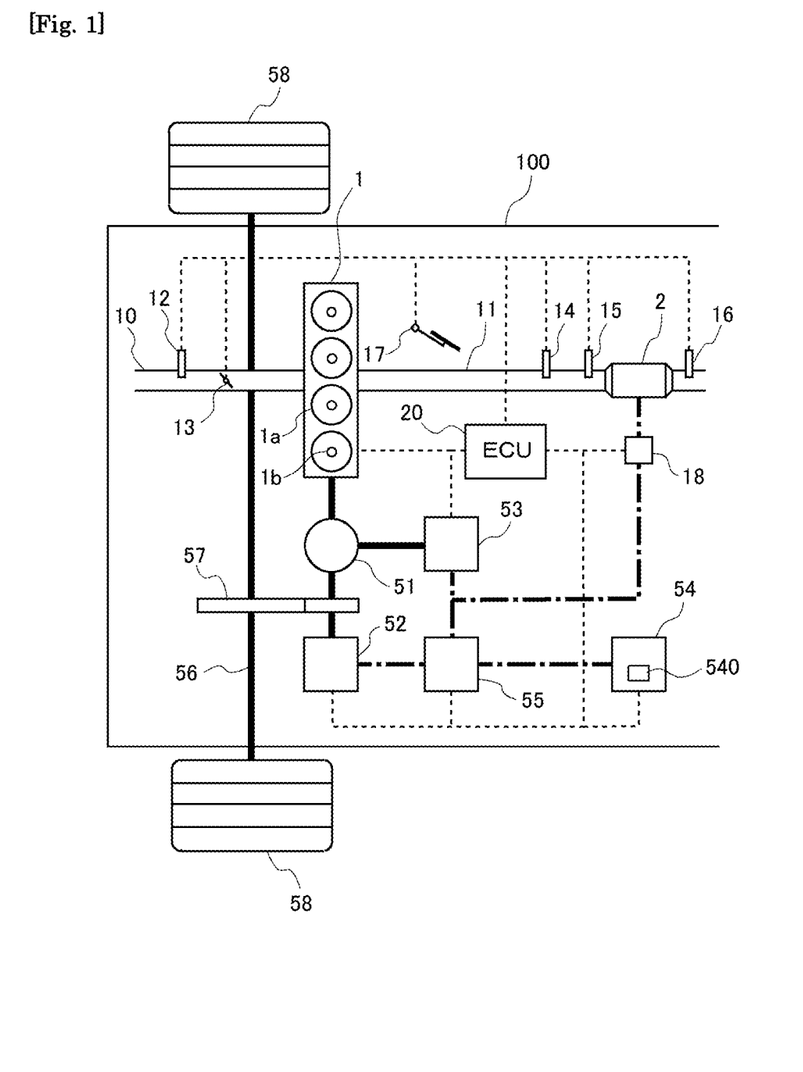
FIG. 1 is a diagram illustrating the general configuration of a vehicle to which the present disclosure is applied.

FIG. 1 is a diagram illustrating the general configuration of a vehicle to which the present disclosure is applied. The vehicle 100 illustrated in FIG. 1 is provided with a hybrid system that drives wheels (driving wheels) 58. The hybrid system includes an internal combustion engine 1, a power split device 51, an electric motor 52, a generator 53, a battery 54, a power control unit (PCU) 55, an axle (or drive shaft) 56, and a reduction gear 57.

The internal combustion engine 1 is a spark-ignition internal combustion engine (or gasoline engine) having a plurality of cylinders 1a. The internal combustion engine 1 has ignition plugs 1b, each of which ignites air-fuel mixture formed in each cylinder 1a. While the internal combustion engine 1 illustrated in FIG. 1 has four cylinders, the present disclosure may be applied to internal combustion engines having less or more than four cylinders. Alternatively, the internal combustion engine 1 may be a compression-ignition internal combustion engine (or diesel engine). The output shaft (or crankshaft) of the internal combustion engine 1 is connected to the rotary shaft of the generator 53 and the rotary shaft of the electric motor 52 through the power split device 51.

The rotary shaft of the generator 53 is connected to the crankshaft of the internal combustion engine 1 through the power split device 51 and generates electrical power mainly using the kinetic energy of the crankshaft. The electric motor 53 can also function as a starter motor by rotating the crankshaft through the power split device 51 when starting the internal combustion engine 1. The electrical power generated by the generator 53 is supplied to the electric motor 52 or stored in the battery 54 by the PCU 55.

The rotary shaft of the electric motor 52 is connected to the axle 56 through the reduction gear 57 and capable of rotating the wheels 58 using the electrical power supplied from the battery 54 or the generator 53 through the PCU 55. The rotary shaft of the electric motor 52 is connected to the power split device 51 also, and the electric motor 52 is capable of assisting the internal combustion engine 1 in rotating the wheels 58.

The power split device 51 includes a planetary gear device. The power split device 51 splits power among the internal combustion engine 1, the electric motor 52, and the generator 53. For example, the power split device 51 control the travelling speed of the vehicle 100 by causing the electric motor 52 to operate with controlled power generated by the generator 53 while causing the internal combustion engine 1 to operate in the most efficient operation range.

The PCU 55 includes an inverter, a step-up converter, and a DC-to-DC converter. The PCU 55 converts direct current power supplied from the battery 54 into alternating current power to supply it to the electric motor 52, converts the alternating current power supplied from the generator 53 into direct current power to supply it to the battery 54, transforms the voltage of power between the inverter and the battery 54, and transforms the voltage of power supplied from the battery 54 to an electrically heated catalyst (EHC) 2, which will be described later.

The internal combustion engine 1 has fuel injection valves each of which injects fuel into each cylinder 1a or intake port. Air-fuel mixture formed by air and fuel injected through the fuel injection valve is ignited by the ignition plug 1b and burns to generate thermal energy, which is used to rotate the crankshaft.

The internal combustion engine 1 is connected with an intake pipe 10. The intake pipe 10 delivers fresh air taken in from the atmosphere to the cylinders of the internal combustion engine 1. The intake pipe 10 is provided with an air flow meter 12 and a throttle valve 13. The air flow meter 12 outputs an electrical signal relating to the mass of the air supplied to the internal combustion engine 1 (or intake air quantity). The throttle valve 13 varies the channel cross sectional area in the intake pipe 10 to control the intake air quantity of the internal combustion engine 1.

The internal combustion engine 1 is also connected with an exhaust pipe 11, through which burned gas (or exhaust gas) burned in the cylinders of the internal combustion engine 1 flows. The exhaust pipe 11 is provided with an EHC 2 as an exhaust gas purification catalyst. The EHC 2 is provided with a heater that generates heat by electrical current supplied to it. The exhaust pipe 11 is provided with an air-fuel ratio sensor (A/F sensor) 14 and a first exhaust gas temperature sensor 15, which are arranged upstream of the EHC 2. The A/F sensor 14 outputs an electrical signal relating to the air-fuel ratio of the exhaust gas. The first exhaust gas temperature sensor 15 outputs an electrical signal relating to the temperature of the exhaust gas flowing into the EHC 2. The exhaust pipe 11 is also provided with a second exhaust gas temperature sensor 16, which is arranged downstream of the EHC 2. The second exhaust gas temperature sensor 16 outputs an electrical signal relating to the temperature of the exhaust gas flowing out of the ECH 2. Alternatively, the exhaust pipe 11 may be provided with only one of the first and second exhaust gas temperature sensors 15, 16, in other words one of the first and second exhaust gas temperature sensors 15, 16 may be eliminated.

An electronic control unit (ECU) 20 is provided for the above-described hybrid system. The ECU 20 is an electronic control unit including a CPU, a ROM, a RAM, and a backup RAM.

The ECU 20 is electrically connected with the air flow meter 12, the A/F sensor 14, the first exhaust gas temperature sensor 15, the second exhaust gas temperature sensor 16, an accelerator position sensor 17, and an SOC sensor 540. The accelerator position sensor 17 outputs an electrical signal relating to the amount of depression of the accelerator pedal (or accelerator opening degree). The SOC sensor 540 is attached to the battery 54 to measure the SOC (State Of Charge) of the battery 54. The SOC mentioned above is the charge level or the proportion of the amount of electrical energy that the battery 54 can discharge at present to the maximum electrical energy that the battery 54 can store (namely, the electrical energy stored in the fully-charged battery).

The ECU 20 controls the internal combustion engine 1 and its peripheral devices (such as the ignition plugs 1b, the throttle valve 13, and the fuel injection valves), the electric motor 52, the generator 53, the PCU 55, and the EHC 2 based on the signals output from the aforementioned sensors. The ECU 20 may be divided into an ECU that controls the hybrid system overall and an ECU that controls the internal combustion engine 1 and its peripheral devices.

Figure 2:
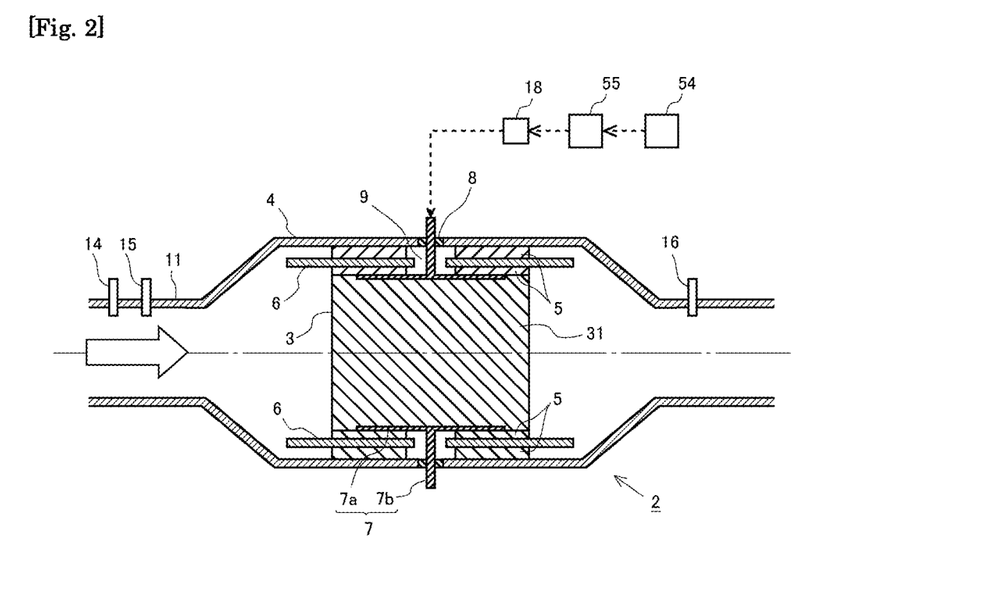
FIG. 2 is a diagram illustrating the general configuration of an electrically heated catalyst (EHC).

The general configuration of the EHC 2 will now be described with reference to FIG. 2. The arrow in FIG. 2 indicates the direction of flow of exhaust gas. The EHC 2 includes a catalyst carrier 3 having a cylindrical shape, an inner cylinder 6 having a cylindrical shape that covers the catalysts carrier 3, and a cylindrical case 4 that covers the inner cylinder 6. The catalyst carrier 3, the inner cylinder 6, and the case 4 are arranged coaxially.

The catalyst carrier 3 is a structure having a plurality of passages extending along the direction of exhaust gas flow and arranged in a honeycomb pattern. The catalyst carrier 3 has a cylindrical outer shape. The catalyst carrier 3 carries an exhaust gas purification catalyst 31. The exhaust gas purification catalyst 31 may be an oxidation catalyst, a three-way catalyst, an NOx storage reduction (NSR) catalyst, a selective catalytic reduction (SCR) catalyst, or a combination of such catalysts. The base material of the catalyst carrier 3 is a material having a relatively high electrical resistance that increases with rise of its temperature (namely, a material having NTC characteristics) and functions as a heating element. An example of such a material is a porous ceramic (e.g. SiC).

The inner cylinder 6 is an insulator with low conductivity and high heat resistance (e.g. alumina or stainless steel coated with an insulation layer on its surface) that is shaped as a cylinder. The inner cylinder 6 is dimensioned to have an inner diameter larger than the outer diameter of the catalyst carrier 3.

The case 4 is a housing made of a metal (e.g. stainless steel) that houses the catalyst carrier 3 and the inner cylinder 6. The case 4 has a cylindrical portion having an inner diameter larger than the outer diameter of the inner cylinder 6, an upstream conical portion joining to the upstream end of the cylindrical portion, and a downstream conical portion joining to the downstream end of the cylindrical portion. The upstream conical portion and the downstream conical portion are tapered in such a way that their inner diameters decrease as they extend away from the cylindrical portion.

A cylindrical mat member 5 is press-fitted in the gap between the inner circumference of the inner cylinder 6 and the outer circumference of the catalyst carrier 3, and another mat member 5 is press-fitted in the gap between the inner circumference of the case 4 and the outer circumference of the inner cylinder 6. The mat member 5 is made of a low-conductive insulating material that provides high cushioning (e.g. an inorganic fiber mat, such as an alumina fiber mat).

The EHC 2 has two through-holes 9 that pass through the case 4, the mat members 5, and the inner cylinder 6. The through holes 9 are located at opposed positions on the outer circumference of the case 4. Electrodes 7 are provided in the respective through-holes 9. Each electrode 7 includes a surface electrode 7a that extends circumferentially and axially along the outer circumference of the catalyst carrier 3 and a stem electrode 7b that extends from the outer circumference of the surface electrode 7a to the outside of the case 4 through the through-hole 9.

A support member 8 is provided between the case 4 and the stem electrode 7b in the through-hole 9 to support the stem electrode 7b. The support member 8 is adapted to stop the annular gap between the case 4 and the stem electrode 7b. The support member 8 is made of an insulating material with low conductivity to prevent short-circuit between the stem shaft 7b and the case 4.

The stem electrodes 7b are connected to the output terminals of the battery 54 through a power supply control unit 18 and the PCU 55. The power supply control unit 18 is a unit controlled by the ECU 20 and has the functions of applying a voltage to the electrodes 7 from the battery 54 through the PCU 55 (i.e. power supply to the EHC 2), controlling the voltage applied to the EHC 2 (or applied voltage) from the battery 54 through the PCU 55, and sensing the current flowing between the electrodes 7 of the EHC 2 per unit time (or catalyst current).

With the above configuration of the EHC 2, when the power supply control unit 18 applies a voltage from the battery 54 to the electrodes 7 through the PCU 55 to energize (in other words, supply electrical power to) the EHC 2, the catalyst carrier 3 behaves as a resistor to generate heat. In consequence, the exhaust gas purification catalyst 31 carried by the catalyst carrier 3 is heated. Thus, if the EHC 2 is energized when the temperature of the exhaust gas purification catalyst 31 is low, it is possible to raise the temperature of the exhaust gas purification catalyst 31 promptly. In particular, energizing the EHC 2 before the startup of the internal combustion engine 1 can reduce exhaust emissions during and just after the startup of the internal combustion engine 1.

In the following, a method of controlling the EHC 2 according to the embodiment will be described. The power supply control unit 18 is controlled in such a way as to energize the EHC 2 if the internal combustion engine 1 is not operating and the temperature of the catalyst carrier 3 is lower than a specific temperature (e.g. a temperature at which the exhaust gas purification catalyst 31 carried by the catalyst carrier 3 is made active) while the hybrid system is in an activated state (that is, a state in which the system can drive the vehicle).

Specifically, when the hybrid system is activated, the ECU 20 firstly senses the state of charge (SOC) of the battery 54 through the SOC sensor 54θ. The ECU 20 also determines the temperature of the central portion of the catalyst carrier 3 at the time of activation of the hybrid system. This temperature will also be referred to as the "bed temperature" hereinafter. Specifically, the ECU 20 estimates the bed temperature at that time on the basis of the bed temperature Tend at the time when the operation of the internal combustion engine 1 was stopped last time and the time elapsed from the time when the operation of the internal combustion engine 1 was stopped last time to the time of activation of the hybrid system, namely the soak time.

Figure 3:
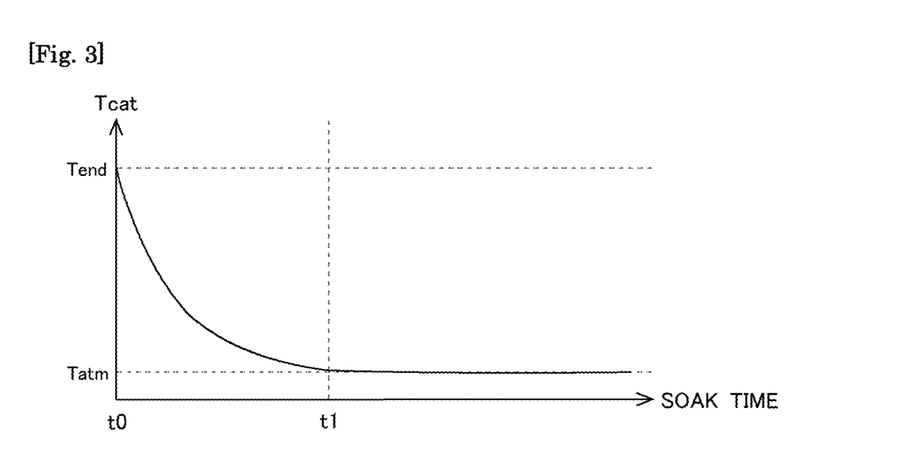
FIG. 3 is a graph illustrating relationship between the soak time and the bed temperature Tcat.

FIG. 3 illustrates the relationship between the bed temperature Tcat of the catalyst carrier 3 and the soak time. After the operation of the internal combustion engine 1 is stopped (at t0 in FIG. 3), the catalyst temperature Tcat of the catalyst carrier 3 falls with time from the bed temperature Tend at the time when the operation of the internal combustion engine 1 is stopped last time. The bed temperature Tcat of the catalyst carrier 3 decreases to eventually become close to the ambient temperature Tatm (at t1 in FIG. 3), and thereafter the bed temperature Tcat is stable at a temperature equal to or close to the ambient temperature Tatm. The system according to the embodiment determines the relationship illustrated in FIG. 3 in advance by experiment or simulation and stores this relationship in the ROM or other component of the ECU 20 as a map or a function expression that enables determination of the bed temperature at the time of activation of the hybrid system from the bed temperature Tend at the time of stopping of the operation of the internal combustion engine 1 and the soak time as arguments. Alternatively, the bed temperature Tend at the time of stopping of the operation of the internal combustion engine 1 may be estimated from the measurement values of the first exhaust gas temperature sensor 15 and/or the second exhaust gas temperature sensor 16 immediately before the stopping of the operation of the internal combustion engine 1 or from the history of the previous operation of the internal combustion engine 1.

Then, the ECU 20 determines whether or not the bed temperature of the catalyst carrier 3 at the time of activation of the hybrid system is lower than a specific temperature. If the bed temperature of the catalyst carrier 3 at the time of activation of the hybrid system is lower than the specific temperature, the ECU 20 calculates the amount of electrical energy that is required to be supplied to the EHC 2 to raise the bed temperature of the catalyst carrier 3 to the specific temperature. This electrical energy will be referred to as the "standard amount of electrical energy" hereinafter. The standard amount of electrical energy calculated is larger when the bed temperature of the catalyst carrier 3 at the time of activation of the hybrid system is low than when it is high. Then, the ECU 20 calculates a consumption SOCcom of the SCO that will result if the standard amount of electrical energy is supplied to the EHC 2. Then, the ECU 20 calculates the remaining amount SOCrmn of the SOC by subtracting the consumption SOCcom from the SOC at the time of activation of the hybrid system (SOCrmn=SOC−SOCcom). The ECU 20 determines whether or not the remaining amount SOCrmn thus calculated is larger than a lower limit. This lower limit is a value of SOC below which it is considered necessary to charge the battery 54 by starting the internal combustion engine 1.

If the remaining amount SOCrmn is larger than the lower limit, the ECU 20 starts the supply of electrical power to the EHC 2 at the time when the SOC becomes equal to the sum of the consumption SOCcom and the lower limit plus a margin. If the remaining amount SOCrmn is larger than an amount that enables the vehicle 100 to travel in the EV mode (the mode in which the vehicle 100 is driven by the electric motor 52 only) for a certain length of time, the vehicle 100 may be driven only by the electric motor 52 when a request for driving the vehicle 100 is made, and the supply of electrical power to the EHC 2 may be started. The aforementioned "certain length of time" is, for example, a length of time longer than the length of time required to supply the standard amount of electrical energy to the EHC 2.

When supplying electrical power to the EHC 2, the ECU 20 sets a target value of electrical power (target electrical power) to be supplied to the EHC 2. The target electrical power is a constant value that is set taking account of factors such as the structure and performance of the devices used to supply electrical power to the EHC 2 (e.g. the generator 53, the battery 54, and the PCU 55). The ECU 20 controls the power supply control unit 18 in such a way as to adjust the electrical power supplied to the EHC 2 to the target electrical power. The electrical power supplied to the EHC 2 is the product of the voltage applied to the electrodes 7 of the EHC 2 (which will be referred to as "applied voltage") and the current flowing between the electrodes 7 of the EHC 2 per unit time (which will be referred to as the "catalyst current").

Figure 4:
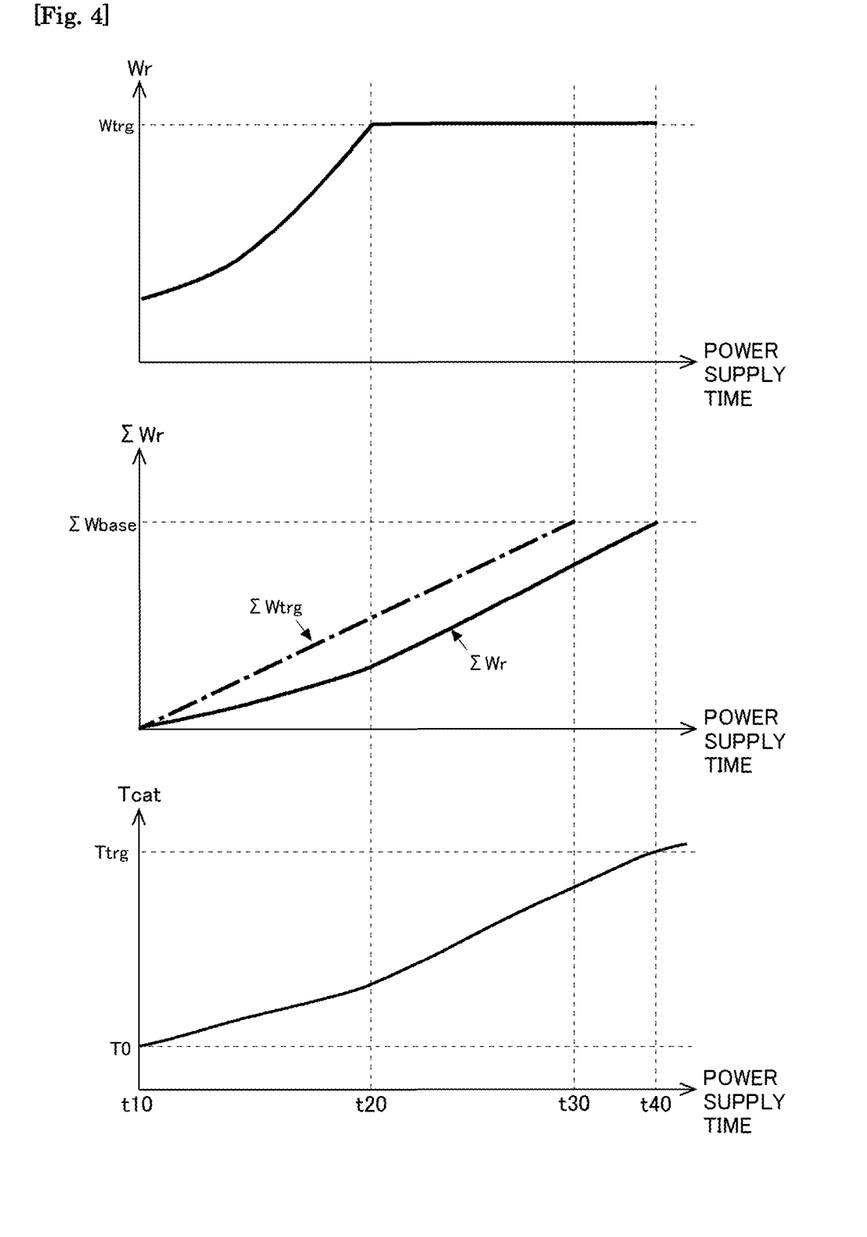
FIG. 4 illustrates changes of the actual electrical power Wr, the actually supplied electrical energy $\Sigma Wr$, and the bed temperature Tcat of a catalyst carrier with time during a period from the start to the end of supply of electrical energy to the EHC.

FIG. 4 illustrates changes in the electrical power actually supplied to the EHC 2 (which will be referred to as "actual electrical power Wr" hereinafter), the integrated value of the actual electrical power (which will be referred to as "actually supplied electrical energy $\Sigma$Wr"), and the bed temperature Tcat of the catalyst carrier 3 with time during the period from the start to the end of the supply of electrical power to the EHC 2.

Figure 5:
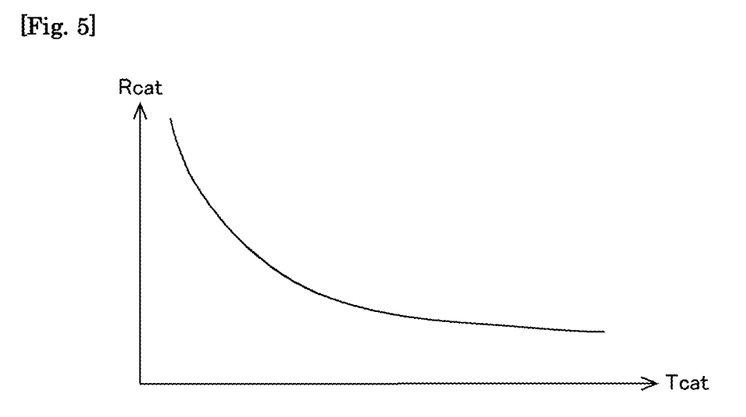
FIG. 5 is a graph illustrating relationship between the bed temperature Tcat of the catalyst carrier and the electrical resistance Rcat of the EHC.

As illustrated in FIG. 4, the actual electrical power Wr is lower than the target power Wtrg during the period from the start of the supply of electrical power to the EHC 2 (at t10 in FIG. 4) to time t20 in FIG. 4. This is because the catalyst carrier 3 of the EHC 2 has NTC characteristics and the voltage that can be applied to the EHC 2 is lower than a specific upper limit. Specifically, when the catalyst carrier 3 has NTC characteristics, the electrical resistance of the catalyst carrier 3 is larger when the bed temperature Tcat of the catalyst carrier 3 is low than when it is high, and accordingly the electrical resistance Rcat of the EHC 2 overall including the catalyst carrier 3 and the electrodes 7 (in other words, the electrical resistance between the electrodes 7) is also larger when the bed temperature Tcat of the catalyst carrier 3 is low than when it is high, as will be seen in FIG. 5. Therefore, when the bed temperature Tcat of the catalyst carrier 3 is relatively low, as is the case just after the start of the supply of electrical power to the EHC 2, the electrical resistance Rcat of the EHC 2 is relatively large. The voltage that can be applied to the EHC 2 has a design upper limit (specific upper limit voltage) that is determined by the structure and performance of the device used to supply electrical power to the EHC 2. Therefore, when the bed temperature Tcat of the catalyst carrier 3 is relatively low, as is the case just after the start of electrical power supply to the EHC 2, since the electrical resistance Rcat of the EHC 2 is relatively large because of its NTC characteristics, the catalyst current will be unduly small even if the voltage as high as the specific upper limit voltage is applied to the EHC 2, resulting in actual electrical power Wr lower than the target electrical power Wtrg.

As the voltage as high as the upper limit voltage continues to be applied to the EHC 2 during the period from t10 to t20 in FIG. 4, the bed temperature Tcat of the catalyst carrier 3 rises from the temperature T0 at the time of starting the supply of electrical power with time, and the electrical resistance Rcat of the EHC 2 decreases with time consequently. In consequence, the catalyst current increases with time, and the actual electrical power Wr also increases with time accordingly. Eventually at time t20 in FIG. 4, the electrical resistance Rcat of the EHC 2 becomes so small that the actual electrical power Wr under the application of the upper limit voltage to the EHC 2 becomes substantially equal to the target electrical power Wtrg. After time t20 in FIG. 4, it is possible to keep the actual electrical power Wr substantially equal to the target electrical power Wtrg by decreasing the voltage applied to the EHC 2 as the bed temperature Tcat of the catalyst carrier 3 rises, in other words as the electrical resistance Rcat of the EHC 2 decreases. Specifically, the power supply control unit 18 measures the catalyst current (i.e. the current flowing between the electrodes 7 of the EHC 2 per unit time) and adjusts the applied voltage (i.e. the voltage resulting from transformation by the PCU 55) in such a way as to make the product of the measured catalyst current and the applied voltage (which is the actual electrical power Wr) substantially equal to the target electrical power Wtrg. When the actually supplied electrical energy $\Sigma$Wr reaches the standard amount of electrical energy $\Sigma$Wbase eventually (at t40 in FIG. 4), the bed temperature Tcat of the catalyst carrier 3 reaches the specific temperature Ttrg. Then, the ECU 20 controls the power supply control unit 18 to stop the supply of electrical power to the EHC 2.

As above, if the standard amount of electrical energy $\Sigma$Wbase is supplied to the EHC 2 before the startup of the internal combustion engine 1, the catalyst carrier 3 and the exhaust gas purification catalyst 31 carried by the catalyst carrier 3 are heated to or above the specific temperature Ttrg. In consequence, the purification performance of the exhaust gas purification catalyst 31 during and just after the startup of the internal combustion engine 1 is enhanced, leading to reduced exhaust emissions. In the following, the above-described process of preheating the exhaust gas purification catalyst 31 before the startup of the internal combustion engine 1 will be referred to as the "preheat process".

If an abnormality such as oxidation of the catalyst carrier 3 or the electrodes 7 or a crack thereof occurs in the EHC 2, there is a possibility that the electrical resistance Rcat of the EHC 2 may become larger than that of the EHC 2 in the normal condition. When this is the case, the actual electrical power Wr becomes lower than that in the normal condition, and consequently the time (or power supply time) required to supply the standard amount of electrical energy $\Sigma$Wbase to the EHC 2 may increase unduly. This may lead to difficulties in raising the bed temperature Tcat of the catalyst carrier 3 to the specific temperature Ttrg in a limited time before the startup of the internal combustion engine 1.

Figure 6:
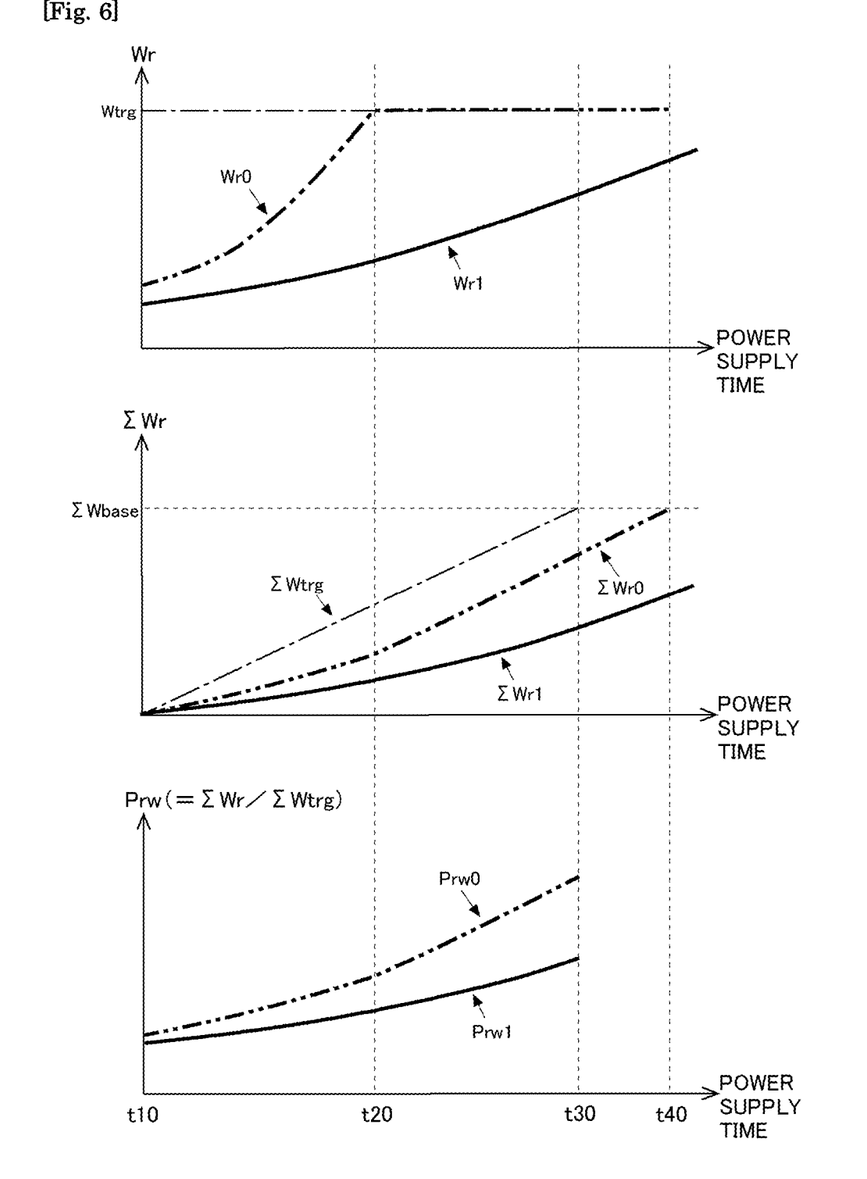
FIG. 6 illustrates changes of the actual electrical power Wr, the actually supplied electrical energy $\Sigma Wr$, and the supplied electrical energy ratio Prw with time in a case where preheating is performed when the EHC has an abnormality.

FIG. 6 illustrates changes in the actual electrical power Wr, the actually supplied electrical energy $\Sigma$Wr, and the ratio Prw of the actually supplied electrical energy $\Sigma$Wr to a target electrical energy $\Sigma$Wtrg with time in a case where the preheat process is performed while an abnormality like those mentioned above is occurring in the EHC 2. The aforementioned ratio Prw will be hereinafter referred to as the "supplied electrical energy ratio". In FIG. 6, the solid curves represent changes in the actual electrical power Wr1, the actually supplied electrical energy $\Sigma$Wr1, and the supplied electrical energy ratio Prw1 in a case where the EHC 2 has an abnormality. The dot-dot-dash curves in FIG. 6 represent changes in the actual electrical power Wr0, the actually supplied electrical energy $\Sigma$Wr0, and the supplied electrical energy ratio Prw0 with time in a case where the EHC 2 is normal. The dot-dash curves in FIG. 6 represent changes in the target electrical power Wtrg and the target electrical energy $\Sigma$Wtrg with time.

In FIG. 6, during the period from the start of power supply to the EHC 2 (at t10 in FIG. 6) to the time when the actual electrical power Wr0 with the EHC 2 in the normal condition substantially reaches the target electrical power Wtrg (t20 in FIG. 6), the actual electrical power Wr0 with the EHC 2 in the normal condition and the actual electrical power Wr1 with the EHC 2 in the abnormal condition both differ from the target electrical power Wtrg due to NTC characteristics of the catalyst cattier 3, though the actual electrical power Wr0 with the EHC 20 in the normal condition is higher than the actual electrical power Wr1 with the EHC 2 in the abnormal condition. In consequence, the actually supplied electrical energy ΣWr0 with the EHC 2 in the normal condition and the actually supplied electrical energy ΣWr1 with the EHC 2 in the abnormal condition both differ from the target electrical energy ΣWtrg. Consequently, during the period from time t10 to time t20 in FIG. 6, the difference between the supplied electrical energy ratio Prw0 with the EHC 2 in the normal condition and the supplied electrical energy ratio Pwr1 with the EHC 2 in the abnormal condition is not large.

After time t20 in FIG. 6, the actual electrical power Wr0 with the EHC 2 in the normal condition is substantially equal to the target electrical power Wtrg, making the rate of increase of the bed temperature Tcat with the EHC 2 in the normal condition higher than that in the period before time t20 in FIG. 6. In consequence, the rate of increase of the actually supplied electrical energy ΣWr0 with the EHC 2 in the normal condition is larger than that in the period before time t20 in FIG. 6. On the other hand, since the actual electrical power Wr1 with the EHC 2 in the abnormal condition differs from the target electrical power Wtrg even after time t20 in FIG. 6, the rate of increase of the bed temperature Tcat with the EHC 2 in the abnormal condition does not significantly differ from that in the period before time t20 in FIG. 6, and accordingly the rate of increase of the actually supplied electrical energy ΣWr1 with the EHC 2 in the abnormal condition does not significantly differ from that in the period before time t20 in FIG. 6. In consequence, after time t20 in FIG. 6, the difference between the actually supplied electrical energy ΣWr0 with the EHC 2 in the normal condition and the actually supplied electrical energy ΣWr1 with the EHC 2 in the abnormal condition increases with time. Accordingly, the difference between the supplied electrical energy ratio Prw0 with the EHC 2 in the normal condition and the supplied electrical energy ratio Pwr1 with the EHC 2 in the abnormal condition increases with time after time t20 in FIG. 6. At the time when the target electrical energy ΣWtrg reaches the standard amount of electrical energy ΣWbase (t30 in FIG. 6), the actually supplied electrical energy ΣWr1 with the EHC 2 in the abnormal condition is significantly smaller than the actually supplied electrical energy ΣWr0 with the EHC 2 in the normal condition. In consequence, the supplied electrical energy ratio Pwr1 with the EHC 2 in the abnormal condition is significantly lower than the supplied electrical energy ratio Pwr0 with the EHC 2 in the normal condition at the time when the target electrical energy ΣWtrg reaches the standard amount of electrical energy ΣWbase (t30 in FIG. 6).

In this embodiment, detection of an abnormality of the EHC 2 is performed based on the supplied electrical energy ratio Prw at the time when the target electrical energy ΣWtrg reaches the standard amount of electrical energy ΣWbase (t30 in FIG. 6), in other words, based on the value of the supplied electrical energy ratio Prw upon the elapse of a specific period of time from the start of the supply of electrical power to the EHC 2. Specifically, if the value of the supplied electrical energy ratio Prw upon the elapse of the specific period of time from the start of the supply of electrical power to the EHC 2 is smaller than a specific ratio Pthre, it is determined that the EHC 2 is abnormal. The specific ratio Pthre mentioned above is such a value that if the value of the supplied electrical energy ratio Prw upon the elapse of the specific period of time from the start of the supply of electrical power to the EHC 2 is lower than the specific ratio Pthre, it may be determined that the EHC 2 is abnormal. In other words, the specific ratio Pthre is such a ratio that if the value of the supplied electrical energy ratio Prw upon the elapse of the specific period of time from the start of the supply of electrical power to the EHC 2 is lower than the specific ratio Pthre, it is difficult to preheat the EHC 2 effectively in a limited time before the startup of the internal combustion engine 1. The specific ratio Pthre is a value equal to the supplied electrical energy ratio Prw with the EHC 2 in the normal condition plus a margin that is set taking account of aged deterioration and variations of the EHC 2.

There may be situations where the vehicle 100 is caused to be driven only by the electric motor 52 to run in the EV mode while electrical power is supplied to the EHC 2. In such situations, the electric motor 52 drives the wheels 58 using electrical power supplied by the battery 54. Therefore, the rate of decrease of the SOC of the battery 54 (or the charge level decrease rate) increases with increase in the running load of the vehicle 100. When the charge level decrease rate during the time when electrical power is supplied to the EHC 2 becomes relatively high, there is a possibility that the SOC may decrease to the aforementioned lower limit while electrical power is supplied to the EHC 2. Then, there is a possibility that the supply of electrical power to the EHC 2 may be stopped before the actually supplied electrical energy ΣWr reaches the standard amount of electrical energy ΣWbase and the internal combustion engine 1 may be started so as to charge the battery 54.

Figure 7:
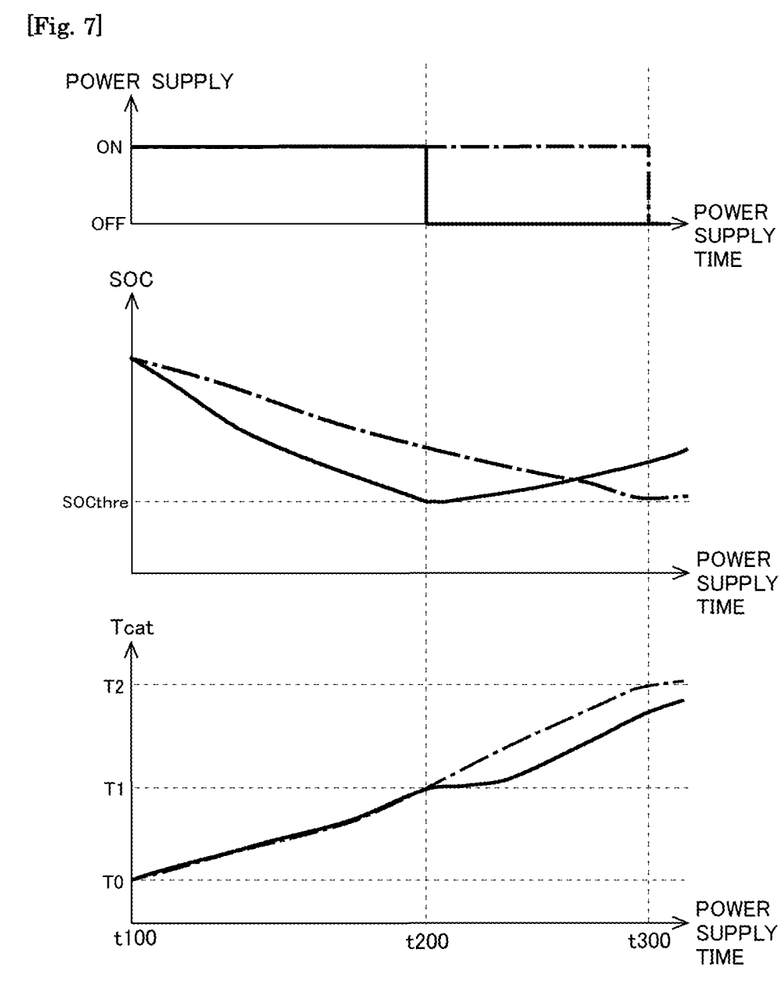
FIG. 7 illustrates the status of power supply to the EHC and changes in the SOC of the battery and the bed temperature Tcat of the catalyst carrier with time in a case where the vehicle is caused to run in EV mode during the preheat process.

FIG. 7 illustrates the status of power supply to the EHC 2 and changes in the SOC of the battery 54 and the bed temperature Tcat of the catalyst carrier 3 with time in a case where the vehicle 100 is caused to run in EV mode during the preheat process. Solid curves in FIG. 7 represent the status of power supply to the EHC 2, the SOC of the battery 54, and the bed temperature Tcat of the catalyst carrier 3 in a case where the running load of the vehicle 100 running in EV mode is relatively high. The dot-dash curves in FIG. 7 represent the status of power supply to the EHC 2, the SOC of the battery 54, and the bed temperature Tcat of the catalyst carrier 3 in a case where the running load of the vehicle 100 running in EV mode is relatively low.

After the supply of electrical power to the EHC 2 is started (turning ON at t100 in FIG. 7), the SOC of the battery 54 decreases with time, and the bed temperature Tcat of the catalyst carrier 3 rises with time from the initial bed temperature T0. When the SOC of the battery 54 decreases to the lower bound SOCthre (at t200 or t300 in FIG. 7), the supply of electrical power to the EHC 2 is stopped (OFF), and the internal combustion engine 1 is started to charge the battery 54. During this process, the decrease of the SOC per unit time (i.e. the charge level decrease rate) is larger when the running load of the vehicle 100 is high (represented by the solid curves in FIG. 7) than when the running load of the vehicle 100 is low (represented by the dot-dash curves in FIG. 7). In consequence, the time when the SOC of the battery 54 decreases to the lower bound is earlier when the running load of the vehicle 100 is high (t200 in FIG. 7) than when it is low (t300 in FIG. 7). Hence, the bed temperature Tcat of the catalyst carrier 3 at the time when the supply of electrical power to the EHC 2 is stopped (or the time when the internal combustion engine 1 is started) is lower when the running load of the vehicle 100 is high than when it is low (T1<T2 in FIG. 7), even if the degree of abnormality of the EHC 2 is the same. Therefore, the cleaning performance of the exhaust gas purification catalyst 31 in the period during and just after the startup of the internal combustion engine 1 is lower when the running load of the vehicle 100 (or the charge level decrease rate) during the supply of electrical power to the EHC 2 is high than when it is low, even if the decree of abnormality of the EHC 2 is the same. In consequence, the amount of exhaust emissions emitted in the period during and just after the startup of the internal combustion engine 1 is larger when the running load of the vehicle 100 (or the charge level decrease rate) during the supply of electrical power to the EHC 2 is high than when it is low, even if the decree of abnormality of the EHC 2 is the same. This difference is large when the SOC of the battery 54 is low than when it is high.

Figure 8:
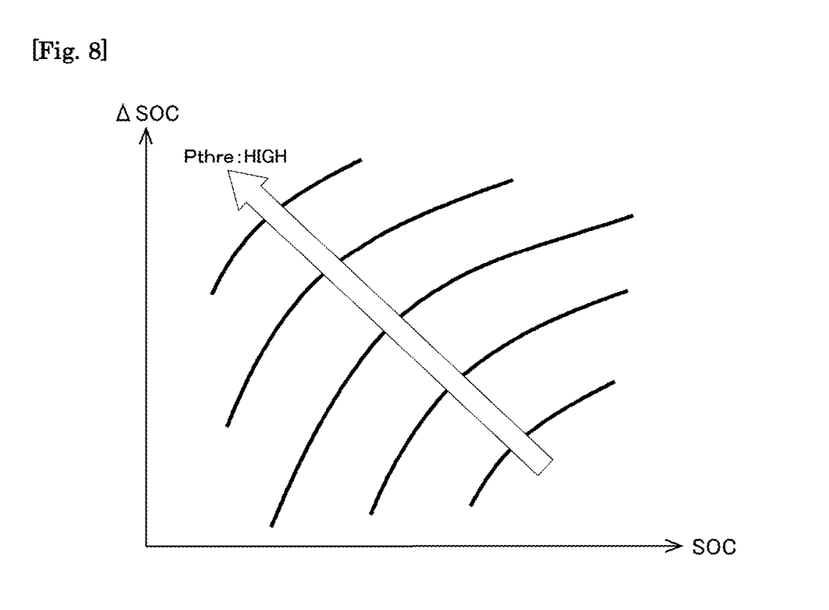
FIG. 8 is a graph illustrating relation of a specific ratio Pthre with the SOC of the battery during the supply of electrical power to the EHC and the charge level decrease rate $\Delta SOC$ during the supply of electrical power to the EHC.

In the abnormality detection process according to the embodiment, the aforementioned specific ratio Pthre is set based on the SOC and the charge level decrease rate of the battery 54 during the supply of electrical power to the EHC 2. Specifically, as illustrated in FIG. 8, the specific ratio Pthre is set higher when the SOC of the battery 54 during the supply of electrical power to the EHC 2 is small than when it is large, and when the charge level decrease rate ΔSOC during the supply of electrical power to the EHC 2 is high than when it is low. The SOC that is used in setting the specific ratio Pthre may be a value measured by the SOC sensor 540 at a specific time in the specific period from the time when the supply of electrical power to the EHC 2 is started to the time when the target electrical energy ΣWtrg reaches the standard amount of electrical energy ΣWbase (e.g. at the time when the supply of electrical power to the EHC 2 is started or the time when the target electrical energy ΣWtrg reaches the standard amount of electrical energy ΣWbase). In an illustrative case described in the following, a value measured by the SOC sensor 540 at the time when the supply of electrical power to the EHC 2 is started is used. The charge level decrease rate ΔSOC used in setting the specific ratio Pthre may be the average of the rate of decrease of the SOC measured by the SOC sensor 540 over the specific period or the largest or smallest value of the rate of decrease of the SOC measured by the SOC sensor 540 during the specific period. In the illustrative case described in the following, the average of the rate of decrease of the SOC measured by the SOC sensor 540 over the specific period is used. If the process of determining an abnormality of the EHC 2 is performed by comparing the supplied electrical energy ratio Prw upon the elapse of the specific period after the start of the supply of electrical power to the EHC 2 and the specific ratio Pthre set as above, it is possible to detect a minor abnormality when the SOC during the supply of electrical power to the EHC 2 is small than when it is large, and when the charge level decrease rate ΔSOC is high than when it is low. Therefore, it is possible to detect an abnormality of the EHC 2 that can lead to an increase in exhaust emissions in the period during and just after the startup of the internal combustion engine 1 with improved accuracy.

(Process of Abnormality Detection)

Figure 9:
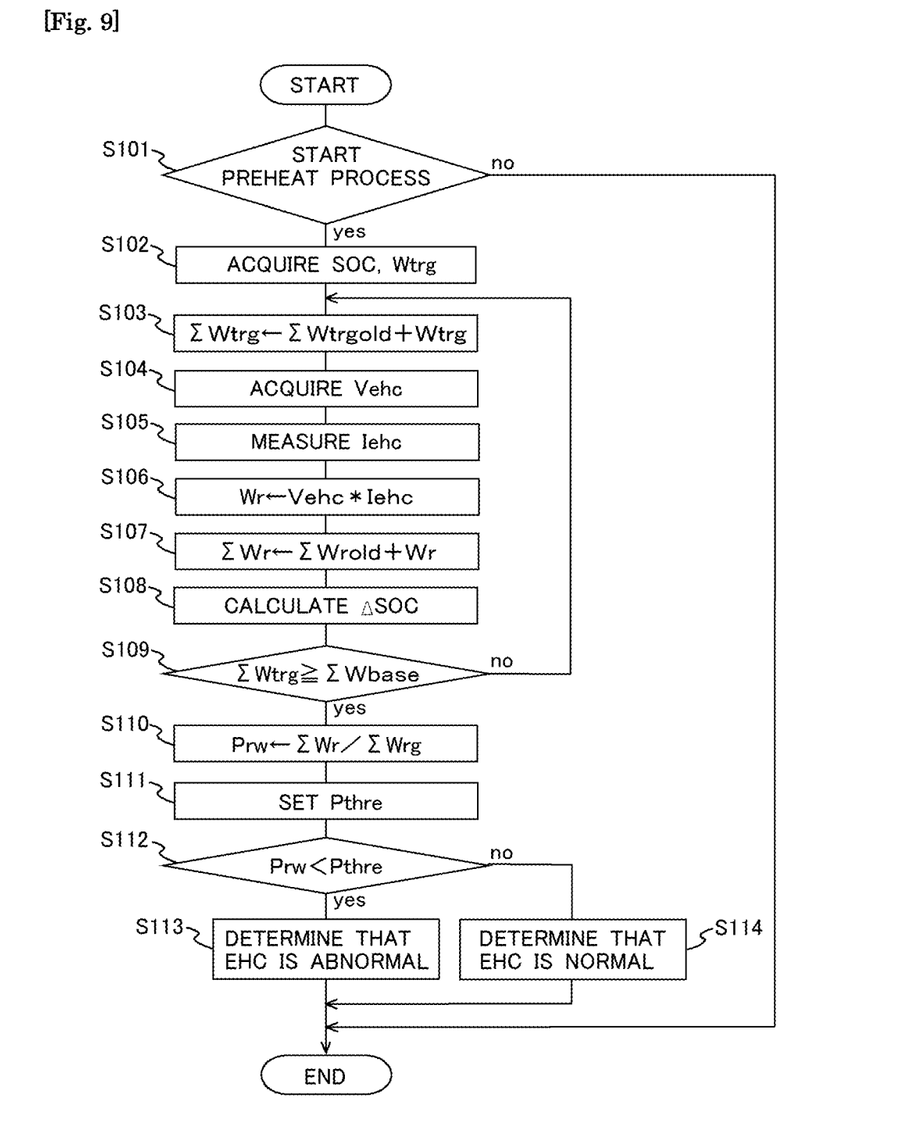
FIG. 9 is a flow chart of a processing routine executed by the ECU in an abnormality detection process according to an embodiment.

In the following, a process of abnormality detection according to the embodiment will be described with reference to FIG. 9. FIG. 9 is a flow chart of a processing routine performed by the ECU 20 in the abnormality detection process according to the embodiment. The processing routine according to the flow chart of FIG. 9 is executed by the ECU 20 and triggered by the start of the above-described preheat process. This processing routine is stored in a ROM or the like of the ECU 20 in advance.

Firstly in step S101 of the processing routine according to the flow chart of FIG. 9, the ECU 20 determines whether or not the preheat process has been started. If a negative determination is made in step S101, the ECU 20 terminates the execution of this processing routine. If an affirmative determination is made in step S101, the ECU 20 proceeds to the processing of step S102.

In step S102, the ECU 20 acquires a measurement value (SOC) of the SOC sensor 540 at the time when the preheat process is started and the target electrical power Wtrg set in the preheat process. As described previously, the target electrical power Wtrg is a constant value that is set taking account of the structure and performance of the device(s) used to supply electrical power to the EHC 2.

In step S103, the ECU 20 calculates the target electrical energy ΣWtrg. Specifically, the ECU 20 calculates the target electrical energy ΣWtrg by adding the target electrical power Wtrg acquired by the processing of step S102 to the previous value ΣWtrgold of the target electrical energy (ΣWtrg=ΣWtrgold+Wtrg). The target electrical energy ΣWtrg is the integrated value of the target electrical power over the period from the start of the supply of electrical power to the EHC 2 to the present time.

In step S104, the ECU 20 acquires the voltage Vehc applied to the electrodes 7 of the EHC 2 (applied voltage) in the preheat process. Then, the ECU 20 proceeds to step S105, where the ECU 20 measures the current Iehc flowing between the electrodes 7 of the EHC 2 per unit time (catalyst current) when the aforementioned applied voltage Vehc is applied to the electrodes 7 by the power supply control unit 18. In step S106, the ECU 20 calculates the electrical power Wr actually supplied to the EHC 2 (actual electrical power) as the product of the applied voltage Vehc acquired by the processing of step S104 and the catalyst current Iehc measured by the process of step S105 (Wr=Vehc*Iehc).

In step S107, the ECU 20 calculates the actually supplied electrical energy ΣWr. Specifically, the ECU 20 adds the actual electrical power Wr calculated by the processing of step S106 to the previous value ΣWrold of the actually supplied electrical energy to calculate the actually supplied electrical energy ΣWr (ΣWr=ΣWrold+Wr). The actually supplied electrical energy ΣWr is the integrated value of the actual electrical power over the period from the start of the supply of electrical power to the EHC 2 to the present time.

In step S108, the ECU 20 calculates the charge level decrease rate ΔSOC. Specifically, the ECU 20 calculates the charge level decrease rate in the period from the last execution of this processing routine to the present execution of this processing routine by dividing the difference between the measurement value of the SOC sensor 540 acquired in the last execution of this processing routine and that acquired in the present execution of this processing routine by the elapsed time from the last execution of this processing routine to the present execution of this processing routine and stores the result of calculation in a RAM of the ECU 20. Thus, the results of calculation of the charge level decrease rate as many as the number of times of execution of this processing routine in the period from the start of the supply of electrical power to the EHC 2 to the present time are stored in the RAM of the ECU 20. Then, the ECU 20 calculates the average of the results of calculation of the charge level decrease rate as the value of the charge level decrease rate ΔSOC.

In step S109, the ECU 20 determines whether or not the target electrical energy ΣWtrg calculated by the processing of step S103 has reached the standard amount of electrical energy ΣWbase. In other words, the ECU 20 determines whether or not the specific period has elapsed since the start of the supply of electrical power to the EHC 2. As described previously, the standard amount of electrical energy ΣWbase is the electrical energy that is required to be supplied to the EHC 2 in order to raise the bed temperature Tcat of the catalyst carrier 3 from the initial bed temperature T0 to the specific temperature Ttrg. The lower the initial bed temperature T0 is, the larger the standard amount of electrical energy ΣWbase is set. If a negative determination is made in step S109 (ΣWtrg<ΣWbase), the specific period has not been elapsed since the start of the supply of electrical power to the EHC 2 yet. Then, the ECU 20 returns to step S103. If an affirmative determination is made in step S109 (ΣWtrg>ΣWbase), the specific period has been elapsed since the start of the supply of electrical power to the EHC 2. Then, the ECU 20 proceeds to step S110.

In step S110, the ECU 20 calculates the supplied electrical energy ratio Prw by dividing the actually supplied electrical energy ΣWr calculated by the processing of step S107 by the target electrical energy ΣWtrg calculated by the processing of step S103.

In step S111, the ECU 20 sets the specific ratio Pthre on the basis of the SOC acquired by the processing of step S102 and the charge level decrease rate ΔSOC acquired by the processing of step S108. Specifically, the specific ratio Pthre is set higher when the SOC acquired by the processing of step S102 is small than when it is large, and when the charge level decrease rate ΔSOC acquired by the processing of step S108 is high than when it is low, as described previously with reference to FIG. 8. For this purpose, relationship of the specific ratio Pthre with the SOC and the charge level decrease rate ΔSOC like that illustrated in FIG. 8 may be stored in the ROM of the ECU 20 in the form of a map or a function expression. This enables the ECU 20 to determine the specific ratio Pthre by accessing the map or function expression using the SOC and the charge level decrease rate ΔSOC as arguments.

In step S112, the ECU 20 determines whether or not the supplied electrical energy ratio Prw calculated by the processing of step S110 is smaller than the specific ratio Pthre set by the processing of step S111. If an affirmative determination is made in step S112 (Prw<Pthre), the ECU 20 proceeds to step S113, where the ECU 20 determines that the EHC 2 is abnormal. If a negative determination is made in step S112 (Prw >Pthre), the ECU 20 proceeds to step S114, where the ECU 20 determines that the EHC 2 is normal.

In the process of detecting an abnormality of the EHC 2 according to the flow chart of FIG. 9, the specific ratio Pthre is set according to the SOC and the charge level decrease rate ΔSOC during a period in which electrical power is being supplied to EHC 2. This enables the system to detect an abnormality of the EHC 2 that can lead to an increase in exhaust emissions in the period during and just after the startup of the internal combustion engine 1 with improved accuracy, even when the supply of electrical power to the EHC 2 is stopped halfway and the internal combustion engine 1 is started.

In this embodiment, the period from the start of supply of electrical power to the EHC 2 to the time when the target electrical energy reaches the standard amount of electrical energy serves as an example of the specific period according to the present disclosure. However, the specific period is not limited to this. The specific period may be any period during which there is a significant difference between the supplied electrical energy ratio with the EHC 2 in a normal condition and that with the EHC 2 in an abnormal condition. For example, the specific period may be the period from the start of supply of electrical power to the EHC 2 to the time when the actual electrical power substantially reaches the target electrical power in the case where the EHC 2 is normal.

While in this embodiment the specific ratio as a specific threshold is set based on the SOC and the charge level decrease rate ΔSOC in a period during which electrical power is being supplied to the EHC 2, the specific ratio may be set based only on the charge level decrease rate ΔSOC in a period during which electrical power is being supplied to the EHC 2. This leads to a simplification of the process of determining an abnormality of the EHC 2.

First Modification

In the above-described embodiment, the charge level decrease rate ΔSOC during the supply of electrical energy to the EHC 2 is acquired based on actual measurement by the SOC sensor 540. Alternatively, the charge level decrease rate ΔSOC may be estimated based on the history of running load during the period from the start of supply of electrical power to the EHC 2 to the present time (e.g. the average of the running load) and properties of the road that the vehicle 100 is expected to travel (e.g. the rising gradient of the road and the possible speed). For example, the charge level decrease rate ΔSOC may be estimated higher when the average of the running load over the period from the start of supply of electrical power to the EHC 2 to the present time is high than when it is low, and when the rising gradient of the road that the vehicle 100 is expected to travel or the possible travel speed is high than when it is low. Properties of the road that the vehicle 100 is expected to travel may be obtained from a navigation system provided in the vehicle 100 or calculated based on information about traffic jams and information about the travelling speed of other vehicles obtained by a communication device provided in the vehicle 100.

Second Modification

In the above-described embodiment the specific ratio Pthre is set according to the SOC and the charge level decrease rate ΔSOC in a period during which electrical power is being supplied to the EHC 2. Alternatively, the specific ratio Pthre may be set taking account of the running load of the vehicle 100 at the time of starting the internal combustion engine 1 in addition to the SOC and the charge level decrease rate ΔSOC. The amount of exhaust emissions tends to be larger when the running load of the vehicle 100 at the time of starting the internal combustion engine 1 is high than when it is low, because of higher engine load just after the startup of the internal combustion engine 1. In view of this, the specific ratio Pthre may be set higher when the SOC during the supply of electrical power to the EHC 2 is small than when it is large, when the charge level decrease rate ΔSOC during the supply of electrical power to the EHC 2 is high than when it is low, and when the running load of the vehicle 100 at the time of starting the internal combustion engine 1 is high than when it is low. Setting the specific ratio Pthre in this way further improves the accuracy of detection of an abnormality that can lead to an increase in exhaust emissions in the period during and just after the startup of the internal combustion engine 1. The running load of the vehicle 100 at the time of starting the internal combustion engine 1 may be estimated based on properties of the road that the vehicle 100 is expected to travel. For example, the running load of the vehicle 100 at the time of starting the internal combustion engine 1 may be estimated higher when the rising gradient of the road that the vehicle 100 is expected to travel or the possible travel speed is high than when it is low.

What is claimed is:

1. An abnormality detection apparatus for an electrically heated catalyst, the abnormality detection apparatus comprising:
   the electrically heated catalyst provided in an exhaust passage of an internal combustion engine provided in a hybrid vehicle, wherein
      the vehicle is configured to switch between a first mode in which the vehicle is driven only by an electric motor energized by a battery and a second mode in which the vehicle is driven by the internal combustion engine and the electric motor in cooperation, and
      the electrically heated catalyst includes an exhaust gas purification catalyst and a heating element configured to generate heat when supplied with electricity, an electrical resistance of the heating element being larger when a temperature of the heating element is low than when the temperature of the heating element is high; and
   a controller including at least one processor,
   wherein the controller is configured to:
      apply a voltage to the electrically heated catalyst from the battery before startup of the internal combustion engine;
      adjust the applied voltage defined as the voltage applied to the electrically heated catalyst so as to make electrical power, which is a product of the applied voltage and a catalyst current, equal to a target electrical power to be supplied to the electrically heated catalyst, wherein the catalyst current is defined as an electrical current flowing through the electrically heated catalyst per unit time;
      calculate an electrical energy parameter relating to an actually supplied electrical energy defined as an integrated value of the electrical power actually supplied to the electrically heated catalyst over a specific period from the time when the application of the applied voltage to the electrically heated catalyst by the controller is started;
      acquire a charge level decrease rate defined as a rate of decrease of a charge level of the battery in the specific period during which the applied voltage is being applied to the electrically heated catalyst by the controller;
      set a specific threshold according to the charge level decrease rate acquired by the controller, wherein the specific threshold is a criterion for abnormality detection of the electrically heated catalyst; and
      detect an abnormality of the electrically heated catalyst by comparing the electrical energy parameter calculated by the controller and the specific threshold set by the controller.

2. The abnormality detection apparatus according to claim 1, wherein the controller is further configured to:
   calculate a first ratio of the actually supplied electrical energy to a target electrical energy defined as an integrated value of the target electrical power over the specific period,
   set a second ratio as the specific threshold, the second ratio being set larger when the charge level decrease rate acquired by the controller is high than when the charge level decrease rate is low, and
   determine that the electrically heated catalyst is abnormal, in response to the first ratio calculated by the controller being smaller than the second ratio set by the controller.

3. The abnormality detection apparatus according to claim 2, wherein the controller is further configured to:
   predict a running load of the hybrid vehicle at the startup of the internal combustion engine, and
   set the second ratio to be larger when the charge level decrease rate acquired by the controller is high than when the charge level decrease rate is low, and when the running load predicted by the controller is high than when the running load predicted by the controller is low.

4. The abnormality detection apparatus according to claim 1, wherein
   the electrical energy parameter is
      a supplied electrical energy ratio, or
      the actually supplied electrical energy in the specific period, or
      a difference between the actually supplied electrical energy and a target electrical energy to be supplied to the electrically heated catalyst in the specific period.

* * * * *